United States Patent [19]

Kalwaites

[11] 3,881,381
[45] May 6, 1975

[54] APPARATUS FOR PRODUCING RETICULATE SHEET MATERIAL

[75] Inventor: Frank Kalwaites, Somerville, N.J.

[73] Assignee: Johnson & Johnson, New Brunswick, N.J.

[22] Filed: May 1, 1972

[21] Appl. No.: 249,425

Related U.S. Application Data

[62] Division of Ser. No. 857,989, Sept. 15, 1969, abandoned.

[52] U.S. Cl. .................. 83/170; 161/113; 161/109; 161/404; 264/284; 264/154
[51] Int. Cl........ B29c 17/02; B29f 5/00; B32b 3/10
[58] Field of Search ............. 161/113, 95, 404, 109; 264/284, 154

[56] References Cited
UNITED STATES PATENTS

| | | | |
|---|---|---|---|
| 2,585,915 | 2/1952 | Chavannes | 264/284 |
| 3,137,746 | 6/1964 | Seymour et al. | 264/154 X |
| 3,405,027 | 10/1968 | Wyckoff | 161/113 |
| 3,441,638 | 4/1969 | Patchell et al. | 264/154 |
| 3,539,433 | 11/1970 | Edwards | 161/113 |
| 3,616,154 | 10/1971 | Dow et al. | 161/113 |

*Primary Examiner*—Willie G. Abercrombie

[57] ABSTRACT

A reticulate polymer sheet material comprising intersecting filaments which are readily stretchable in the direction of their axis and which form a pattern of discontinuous areas. The filaments are integral at the intersections and some of the discontinuous areas are usually covered by or partially covered by a thin film of the polymer. The reticulate sheet material is made by heating a polymer film to a temperature of from 280° to 425°F, whereby the molecules in the film become sufficiently mobile to redistribute themselves and the film is capable of being reformed into a desired pattern. Applying sufficient forces to the heated film to form the film into a pattern of continuous thick areas and discontinuous thin or open areas. The formed film is cooled to less than 240°F. to produce the reticulate sheet material.

42 Claims, 5 Drawing Figures

APPARATUS FOR PRODUCING RETICULATE SHEET MATERIAL

This is a division of application Ser. No. 857,989, filed Sept. 15, 1969, now abandoned.

This invention relates to a new polyolefin netlike or reticulated sheet material and to method and apparatus for manufacturing the same.

Oriented and unoriented reticulated or net-like materials made from polyolefins such as polypropylene have become increasingly important for various end uses. The unoriented materials have found substantial use in the packaging and decorative industries. The oriented materials have found considerable use as substitutes for woven fabrics and as reinforcements for nonwoven fabrics, paper, and the like. In order to produce the oriented materials, it is important that the plastic be in the correct physical structure and have the correct chemical structure to allow for economical orientation and allow for orientation on a continuous basis with good efficiency. If the physical structure or the chemical structure is not correct then stretching or orienting such materials is not practical or results in a nonuniform product.

I have discovered a new method for continuously producing a new polyolefin sheet material which may be readily oriented or stretched in desired directions to produce open and net like structures on a continuous basis. My new improved material may be readily oriented with few, if any, weak areas so that the tenacity of the oriented material is high and my processing economical.

In accordance with the present invention, my new material is made by heating a film of high-density polyethylene or a predominantly isotactic polypropylene to a temperature of from 280° to 425°F. The heated film is dynamically formed on a patterned forming member. The forming member has a plurality of recessed areas arranged to form a discontinuous pattern of raised areas in the forming member. The heated film is placed on the forming member and dynamically formed to the desired pattern of intersecting filaments. In dynamically forming the heated film sufficient forces, i.e., compressive and shearing forces, must be applied to the heated film. Adequate forces are applied to the film by forming the film under a mechanical pressure of from 18 to 125 pounds per linear inch and preferably from about 24 to 100 pounds per linear inch. The film is formed into a pattern of filaments corresponding to the recessed areas of the forming member with the filaments being integral at their intersections. While the formed film is still on the forming member it is cooled to a temperature of less than 240°F. and the cooled formed film removed from the forming surface.

The material produced is a reticulate sheet material of the starting polymer. The material comprises intersecting filaments which form a pattern of discontinuous areas. The filaments are integral at their intersections, i.e., the filaments merge together at the intersections rather than crossing one another at each intersection. Some of the discontinuous open areas are covered or partially covered with a thin film of the polymer. In some instances the thin film of polymer may be mere flashing in the corners of the open area. The thin film of the polymer is less ductile than the filaments. These thin film areas have a rate of penetration ductility as will be hereinafter described, of less than $7 \times 10^{-5}$ inches /°K. In many instances these thin film areas have so little ductility that they are actually impenetrable. Furthermore, these film areas where present, have a thickness of less than 10 percent of the thickness of the filaments.

Usually, the reticulate sheet material which is formed will have a set of filaments running in the direction of the length of the material and a set of filaments running cross-wise to the length or transverse of the material with the filaments intersecting at substantially right angles to each other and being integral at their intersections. The intersecting filaments form a pattern of square or rectangular shaped thin or open areas in the sheet material. For the most part, the following description will relate to such a specific pattern. Of course other patterns may be used wherein the filaments are formed diagonally or one set diagonally and the other longitudinally or various other patterns of intersecting filaments.

The products produced where the filaments run the length and the width of the sheet material are readily stretchable along the axis of the filaments to orient the filaments and produce strong net-like products. When using polypropylene, the reticulate material should be heated to 275° to 325°F. during the stretching operation. If polyethylene is used, the temperature during stretching may be as low as 220°F. The stretching may be accomplished by passing the heated material through a tenter frame to stretch it in the cross-wise direction, followed by passing the crossstretched material through a series of nip rolls with successive rolls running at faster speeds to stretch the material in the longitudinal direction or vice versa. My new reticulate sheet material may be stretched and oriented uniformly at stretched ratios of from about 2 to 1 to 8 or 9 to 1 in both directions or even higher to produce extremely strong polyolefin net materials.

In practicing the present invention and forming my new reticulate sheet material the discontinuous areas between filaments may be anywhere from completely open to being completely covered with a thin film of polymer. In some instances portions of the reticulate sheet material will have completely open areas between filaments while other portions will have areas between filaments which are completely covered with a thin film while still other portions will have areas which are partially covered or have a "flashing" of polymer in the corners of the areas between filaments.

It is extremely important that when thin film areas are formed, they have certain physical characteristics because without such characteristics, these thin films of polymer will prevent further stretching of the reticulate sheet material. The windows or thin film areas which are formed in the reticulate sheet material must be less ductile than the thick areas or filament areas. Unless these areas are less ductile, when the film is stretched it will not open and the windows will not merge with the filaments but either the reticulate sheet material will break or it will reform into a film.

Throughout this specification ductility is meant as a measure of plasticity and is measured by the rate of penetration of a probe into the material under controlled temperature conditions and will be hereinafter referred to as the rate of penetration ductility of the material. The more ductile the material the faster the rate of penetration while the less ductile the slower the rate of penetration and if the material is sufficiently non-ductile, there may be no penetration. The mathematical figures used for rate of penetration ductility throughout this specification refer to the rate of penetration under a 6 gram load under standard temperature conditions. The temperature conditions at which this rate of penetration is measured are at a temperature rate of 10° Kelvin per minute. This measure of rate of penetration ductility may be obtained on a thermomechanical analyzer such as the Model TMS-1 Precision Thermomechanical Analyzer sold by the Perkin-Elmer Corp. The sample to be measured is placed on a horizontal surface and a probe having an appropriate tip diameter is loaded with a 6 gram weight and allowed to settle on the sample surface. A furnace is placed around the sample and the program is started. The temperature is raised at the rate of 10 Kelvin per minute and any motion of the probe tip relative to the sample caused by thermally induced changes in the sample is transmitted as a signal and recorded on any standard recorder. The rate of penetration ductility measurements given throughout this specification relate to such a measurement under a 6 gram load at a programmed temperature rate of 10° Kelvin per minute. The faster the rate of penetration the more ductile the material while the slower the rate of penetration the less ductile the material.

In accordance with the present invention the thin film areas of my reticulate sheet material must have a rate of penetration ductility of less than $7 \times 10^{-5}$ inches/°K and preferably less than $5 \times 10^{-5}$ inches/°K. In many instances my thin film areas will be sufficiently non-ductile that they will not be penetrated by a 6 gram load. Furthermore, these thin film areas should also have a thickness of 10 percent or less of the thickness of the filament. That is if you have a 15 mil filament or rib, then the thin film area should be 1.5 mils in thickness or less.

In most instances my new reticulate sheet material will have a very low percent elongation at ambient conditions. Unexpectedly, my new formed material has less than 25 percent elongation and usually less than 10 percent elongation in any direction. This phenomena is true even if the starting material has very high elongation properties. It is theorized that this low elongation characteristic arises from the amount and size of crystals and maybe even the type of crystals which are produced in the reticulate material formed in accordance with the present invention. These low elongation properties require that the reticulate material be heated during the stretching operations but have an important advantage in that the reticulate material is stable and can be easily handled during subsequent processing.

In producing my reticulate sheet material the polymer film or starting material must be thermoplastic and must have a crystalline structure. The material must be thermally stable at the process conditions. The material should have a sufficient melt viscosity so that it can be formed under process conditions. Polymers having melt indices from 3 to 30 have been found satisfactory. The temperature at which the polymer resolidifies, i.e., goes from liquid state to the solid state, must be high enough to permit rapid solidification. When using polypropylene, this temperature of resolidification is about 240°F. and for polyethylene about 220°F. This rapid solidification is necessary so that the formed material can be continuously removed from the forming surface. The film or starting material should have a thickness of from about 2 to 15 mils and preferably from about 6 to 8 mils. The width of the film may be any size dependent upon the apparatus used to process the film.

The apparatus used to form my new reticulate sheet material comprises a continuous heating surface such as a rotatable roll. A continuous forming surface such as a rotatable roll is positioned with its axis parallel to the axis of the heated roll so as to form a nip through which the film can pass. The forming roll is engraved in the desired pattern. The forming roll should be resilient and is mounted so that it may be pressed against the surface of the heated roll. The forming roll should be sufficiently resilient so that it will return to its original shape during a revolution of the forming roll. In operation the film to be dynamically formed is placed on the surface of the heated roll at a position disposed from the forming roll so as to give the heated roll sufficient time to heat the film to at least 280°F. before it contacts the forming roll. At the point where the film contacts the forming roll compressive and shearing forces are applied to the film as it passes through the nip formed by the heated roll and forming roll. Pressures of from 18 to 125 pounds per linear inch are applied at the nip. The film passes from the heated roll to the forming roll and is dynamically formed into the desired pattern. Under the above conditions the formed film will follow the surface of the forming roll. While on the surface of the forming roll the film is cooled to about 240°F. as the forming roll rotates. At this point the formed film may be removed from the forming roll as a reticulate sheet material.

It is preferred that the heated roll or heating means have a uniform temperature across its surface. However, if the heated roll or heating means does have a heat gradient across its surface, such a gradient must be uniform. That is, the temperature should not vary more than 30°F. across the surface of this roll. The surface of the heated roll is releasable and non-reactant so that it does not react with the polymer material. A polished chrome surface has been found suitable. The surface of the heated roll must be wettable so that the polymer will cling to the surface and not form wrinkles or folds but will uniformly cover the surface of the roll. The heated roll must be capable of operating with a high heat transfer output. The heated roll should be rigid and uniform so that uniform pressures may be applied against it. The circumference of the heated roll should be at least 1/12 of the process speed at which the apparatus is operated in feet per minute, e.g., for operations at a rate of 36 feet per minute the circumference of the roll should be 3 feet, while for operations at 100 feet per minute the circumference of the roll should be approximately 8 feet.

The forming roll should have a thermally stable and non-reactive surface so that it will not react with the polymer. The surface of the forming roll is resilient as previously described. The forming roll should have a durometer hardness of from 45 to 90. The forming roll should have an overall coefficient of heat transfer in the range of 10 BTU's per hour per degree Fahrenheit per square foot. Such a heat transfer coefficient is needed in order to form the polymer into the desired pattern. Higher heat transfer coefficients result in the removal of heat too fast from the film and disrupts the forming operation and also produces windows which are too ductile. Lower heat transfer coefficients will not remove sufficient heat from the formed film to allow it to cool at an acceptable rate so that the film can be further processed. Suitable forming rolls can be made from rubber having a durometer hardness of about 60.

The forming roll should be thermally controllable, that is, capable of being either heated or cooled under controlled conditions to maintain the desired heat transfer at the nip. The diameter and circumference of the forming roll should be such that when it has made approximately one-half a revolution, the temperature of the formed sheet material or film on the roll is reduced to below 240°F. when processing polypropylene and 220°F. when processing polyethylene to allow the reticulate sheet material to be further processed. under these conditions the rate of processing of the polymer is about 0.12 lbs. per hour per square inch of the forming surface.

The pattern on the forming roll as previously mentioned, may be any desired shape. The continuous recessed areas may have various depths and widths, and the discontinuous raised areas may have any suitable shape, usually rectangular or square. The force at the nip must be in the range of from 18 to 125 pounds per linear inch in order to obtain suitable forming results. It is preferred that the forces applied to the polymer in accordance with the present invention be in the range of 24 to 100 pounds per linear inch. The heated roll should have a temperature of about 340°F. or higher. The forming roll temperature is generally about 100° less than the heated roll temperature so that the forming roll temperature is about 240°F. It is preferred that the forming roll rotate slightly faster than the heated roll. The speeds will depend on the pattern being used and the thickness of the film being processed. Generally, peripheral linear speeds of the forming roll about 10 to 20 percent faster than the peripheral linear speed of the heated roll have been found satisfactory. Peripheral linear speeds of the forming roll of about 2 feet per minute greater than the peripheral linear speed of the heated roll are suitable.

The starting material, as previously mentioned, should have a melt index from about 3 to 30. The material should be substantially non-degradable at processing temperatures and have a solidification temperature in the neighborhood of about 220° to 240°F., most certainly no lower than 200°F. and as high as 40° below its melting temperature. Suitable materials which meet these prerequisites are high density polyethylene and predominantly isotactic polypropylene. Isotactic polypropylene normally has a helical configuration and crystallizes into 3 phases; and $\alpha$-phase, a $\beta$-phase and a $\gamma$-phase. The normal phase of crystallization is the $\alpha$-phase which is monoclinic. The $\beta$-phase is hexagonal and the $\gamma$-phase is triclinic. Upon crystallization, the polypropylene is capable of being oriented, that is, its molecules may be aligned to give it considerably more strength than it had in the unoriented stage. The type and amount of crystallization which is formed in the polypropylene will depend upon the temperature to which it is heated and the rate at which it is cooled and also on other properties of the polypropylene. I have theorized that to produce a suitably formed/polypropylene film according to the present invention there must be come; i.e., at least 25 percent $\beta$-phase present at sometime during the operation. I am not certain whether it it is the $\beta$-phase that is required or whether it is the exact type of crystallization that is required, that is, the amount and size of the crystals that are formed which may also be important. However it is critical that the polypropylene film be heated to a temperature of from 280° to 425°F. and formed. Heating to these temperatures will result in partial melting of the polypropylene and the cooling determines the amount of crystallization and the size of the crystals that will be produced. It is believed that in some instances $\beta$-phase need not be present in the final material, but that $\beta$-phase was, in fact, present at some time during the operation. The resultant reticulate sheet material produced in accordance with the present invention is readily stretchable along the axis of its filaments at elevated temperature conditions to produce strong, open net-like products which have various end-uses as previously described. The material must be heated to a temperature of from about 275° to 325°F. during the stretching operation and should be stretched at ratios of from about 2 to 1 to 11 to 1 along the axis of the filaments to open the material and produce orientation in the filaments and give the resultant net-like product good strength.

The invention will more fully described when taken in conjunction with the accompanying drawings wherein.

Figure 1:
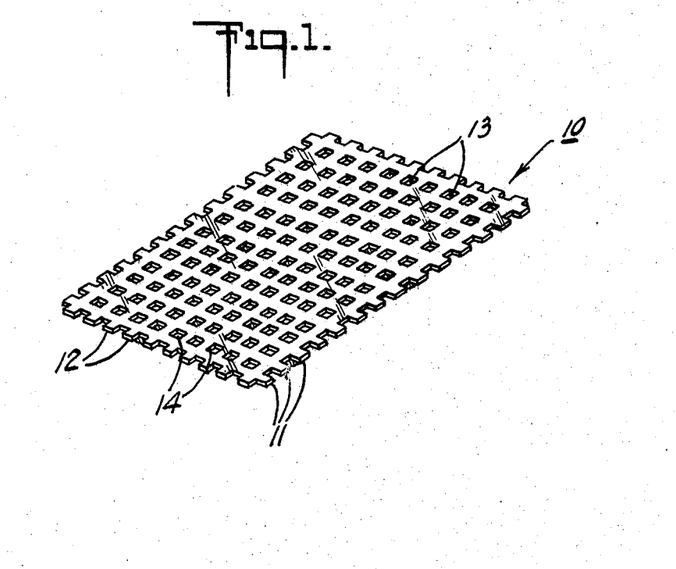
FIG. 1 is a view in perspective of an unoriented formed reticulate sheet material according to the present invention.

Referring to the drawings, in FIG. 1 there is shown, formed, reticulate sheet material 10 produced in accordance with the present invention. The material shown has a square pattern and contains filaments 11 running transverse of the material and filaments 12 running in the longitudinal direction of the material. There are openings 13 between the transverse and longitudinal filaments and some of these openings are glazed over with a thin film of material 14.

Figure 2:
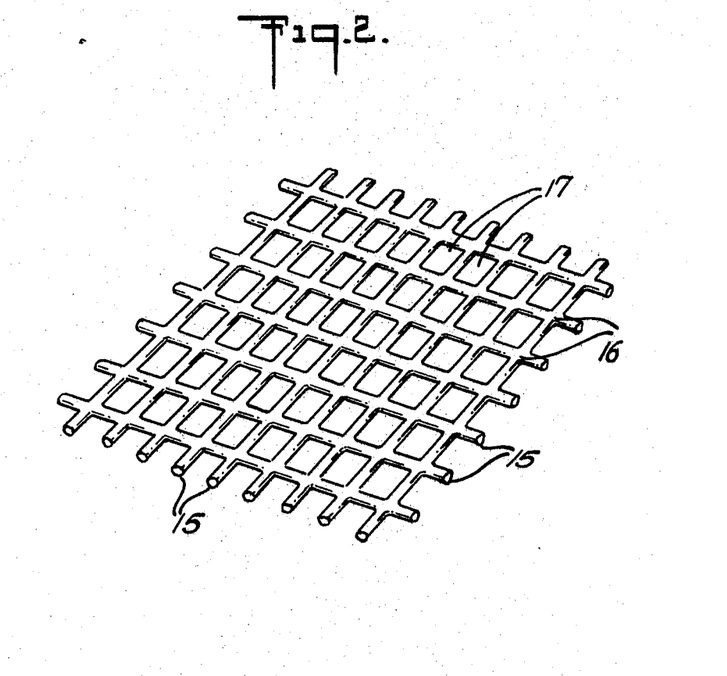
FIG. 2 is a view in perspective of the material of FIG. 1 which has been stretched in the transverse and longitudinal directions.

Referring to FIG. 2, there is shown the material of FIG. 1 after it has been stretched in both the longitudinal and transverse directions. The resultant stretched net comprises filaments 15 running in both directions. The filaments meet at junctures 16 and are integral at this juncture. The areas 17 between the longitudinal and transverse filaments are completely free of polymer.

Figures 3, 4:
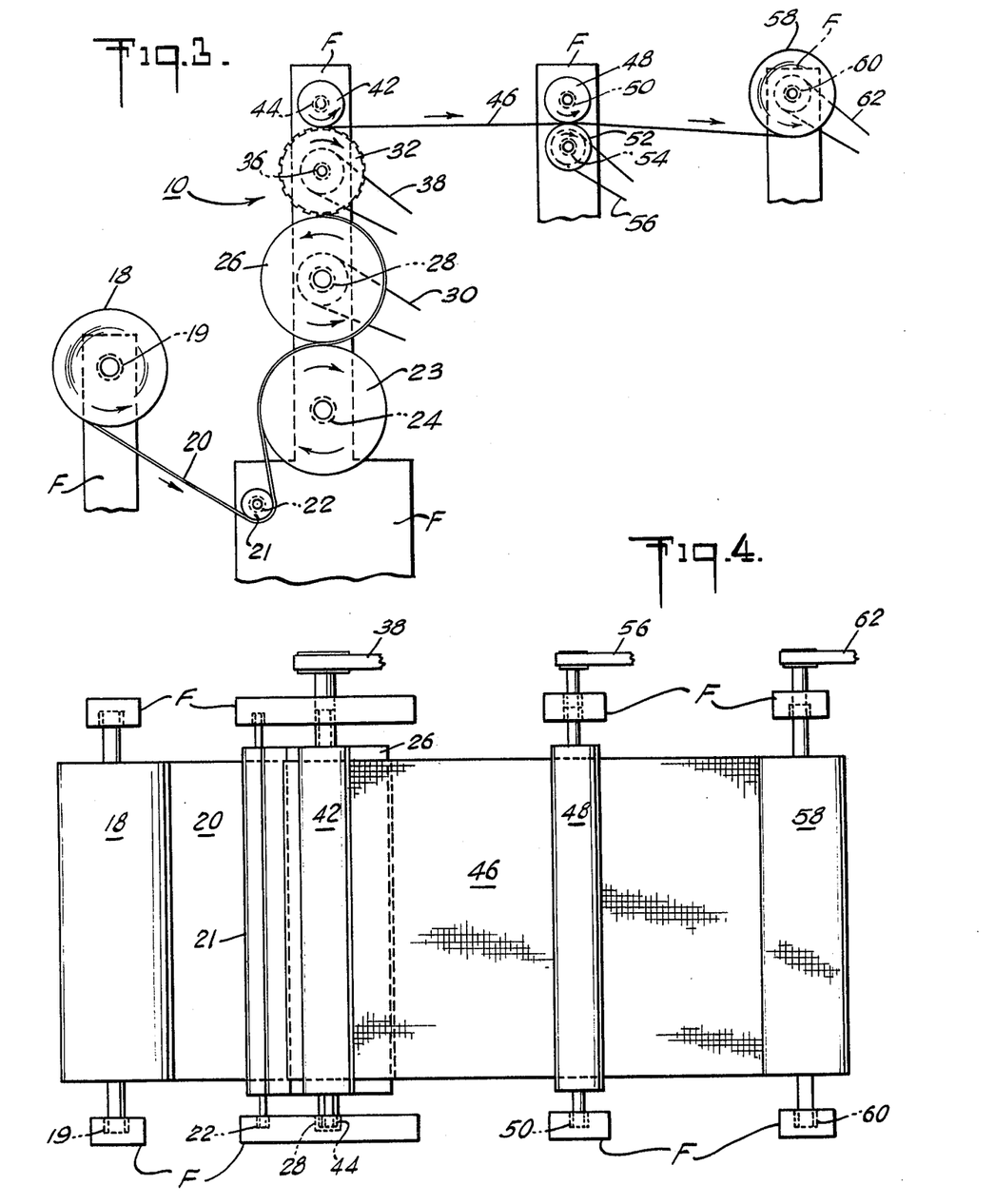
FIG. 3 is a schematic view in elevation of one type of forming apparatus according to the present invention.
FIG. 4 is a plan view of the apparatus shown in FIG. 3.

Referring to FIGS. 3 and 4 there is shown apparatus for producing reticulate sheet material in accordance with the present invention. The supply roll 18 of isotactic polypropylene film 20 is mounted for rotation in bearings 19 mounted in suitable framing F. The film from the supply roll feeds about an idler roll 21 suitably mounted for rotation in bearings 22 mounted in framing F. The film passes about a portion of the circumference of the heated roll 26. The heated roll is mounted for rotation in bearings 28 mounted in framing and is driven by suitable drive mechanism 30. The rolls 23 and 26 are preferably polished chrome to prevent any sticking of the film to the surface. The heated roll 26 may be heated by steam or other similar heating means which may be circulated through the roll. The heated roll may have any diameter and the diameter will be controlled by the amount of heat it is desired to be transferred to the film as it passes around the surface of the roll. The circumference of the heated roll should be approximately 1/12 the desired rate of speed processing as previously described. The heated roll must raise the temperature of the film to at least 280°F. Upon heating to this temperature, the film passes between the forming roll 32 and the heated roll. The forming roll is mounted for rotation in suitable bearings 36 mounted in the frame and is driven by suitable drive means 38. The speed relationship between the forming roll and the heated roll must be such that the heated film will fill up the pattern in the forming roll. Satisfactory results have been obtained by running the forming roll slightly faster than the heated roll and speeds of forming roll to heated roll of from about 1.1:1 to 1.2:1 have been found satisfactory. The forming roll may be of any desired diameter and diameters of from about 3 to 6 inches have been found satisfactory. The forming roll may be either heated or cooled in order to cool the film on the roll to a temperature of less than 240°F. and maintain steady state operations.

The surface of the forming roll is resilient and has approximately a 60 durometer hardness.

The formed material is carried about the surface of the forming roll and passes between the nip formed by idler roll 42 mounted for rotation in bearings 44 in the frame.

Hydraulic means or other means, not shown for sake of clarity, are used to place pressure between the nip of the idler roll 42, and the forming roll 32 and also at the nip between the forming roll 32 and the heated roll 26 to apply the requisite forces to the film during the forming operation. The use of the idler roll to place pressure across the entire length of the forming roll gives good control of the pressure applied. Pressures from about 18 to 125 pounds per linear inch have been found satisfactory. The reticulate sheet material 46 as formed is passed from the nip formed by the idler roll 42 and the forming roll 32, into the nip of a pair of rolls 48 and 52 mounted for rotation in beariings 50 and 54 mounted in suitable framing F. One of the nip rolls 54 is driven by standard drive means 56. The material is fed to a standard take-up roll means 58 mounted for rotation in bearings 60 mounted in suitable framing and driven by standard drive means 62.

Figure 5:
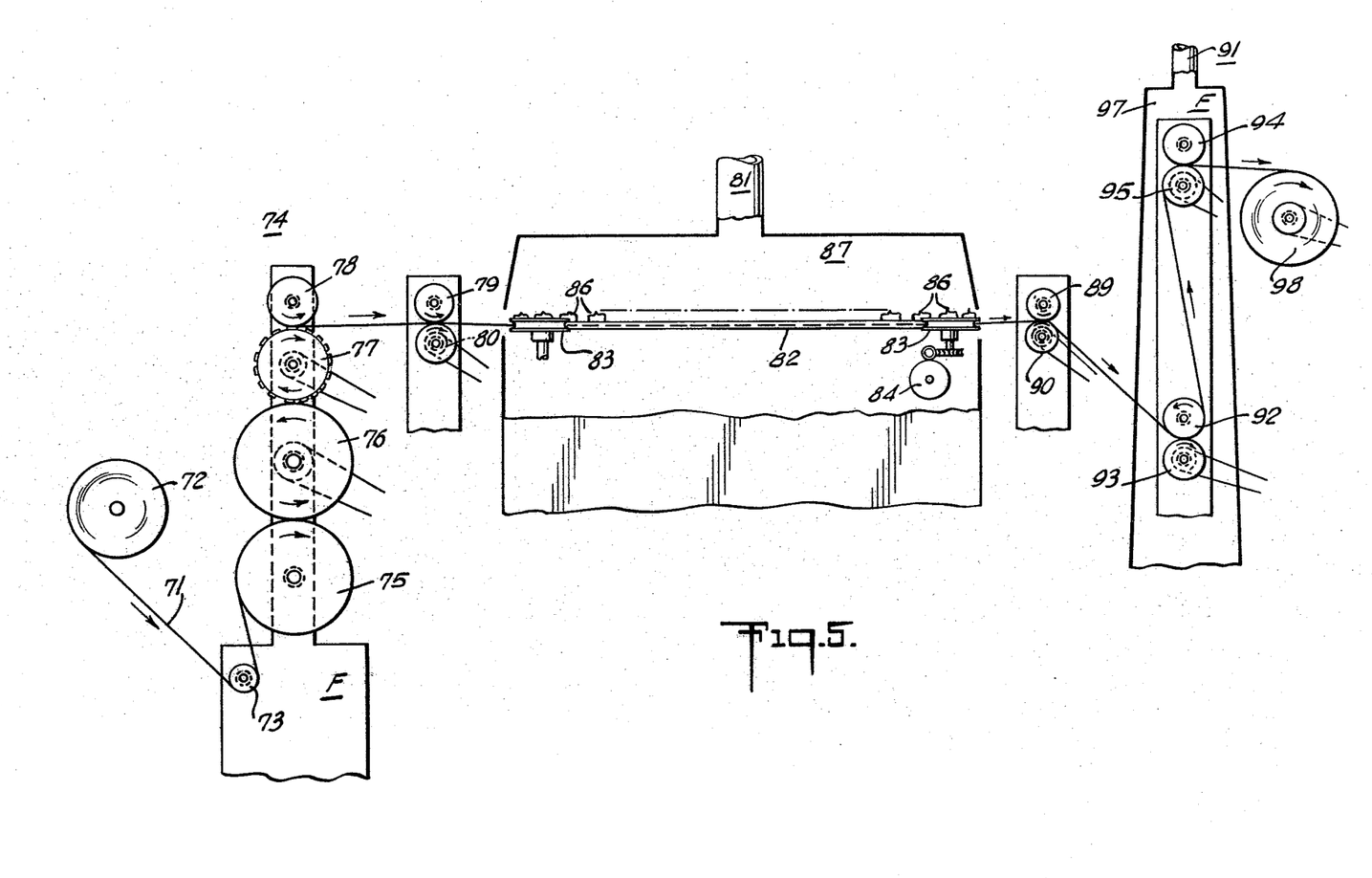
FIG. 5 is a schematic view in elevation of apparatus for heating, forming, cooling, and stretching material in accordance with the present invention.

Referring to FIG. 5 in the drawings there is shown schematically a process for producing reticulate sheet material and stretching the material to orient it. A supply of film 71 is fed from supply roll 72 about an idler roll 73 through the forming unit 74 mounted in suitable framing F. The forming unit comprises a first roll 75 for controlling the feed to and around the second roll 76 which is heated by any of the standard heating means. The film is heated by passing about a portion of the periphery of roll 76 and is formed by forming roll 77 in contact with the heated roll as previously described in conjunction with FIGS. 3 and 4. After the film is formed it passes between the nip formed by the idler roll 78 and the forming roll and is allowed to cool. The cooled material passes to a pair of nip rolls 79 and 80 and is fed into a transverse stretching mechanism 81. In this instance a tenter frame is used which comprises a pair of diverging chain/conveyors 82 mounted on suitable pulleys 83. The chain conveyors are driven by suitable drive mechanism 84. The material enters from the left hand side of the tenter frame where the chains are at their closest point. The material is gripped along its edges by tenter clips 86 and the material conveyed through the tenter frame as the chains diverge spreading the material in a transverse direction. This entire system is heated by a suitable oven 87 to maintain the material at the desired temperature through the transverse stretching operation. The film passes from the tenter frame to a pair of nip rolls 89 and 90 for control and to a longitudinal stretching device 91. The longitudinal stretching device is a standard mechanism and comprises two sets of nip rolls. The bottom pair of rolls 92 and 93 are mounted for rotation in framing F with the bottom roll 93 of this pair being driven. The top pair of rolls 94 and 95 also are mounted for rotation in the frame with the bottom roll 95 of this pair also driven. The top pair of rolls are driven at a faster peripheral linear speed than the bottom pair of rolls and the speed may be adjusted to produce the desired longitudinal stretching for orientation of the material. Transverse stretching ratios of from about 2:1 to 11:1 or higher have been found satisfactory and longitudinal stretching ratios of from 2:1 to 11:1 or even higher have been found satisfactory for producing strong oriented polypropylene nets. During the longitudinal stretching the net must also be heated by a suitable oven 97 in order to longitudinally stretch the material. After the stretching operation the oriented net is wound on a standard wind-up mechanism 98 mounted in suitable framing.

In the drawings, complete drive means such as motors, pulleys, sprockets and the like have not been illustrated for all the rolls nor have the various pressure applying means been illustrated for all the rolls. It must be understood that this has been done because such drive means and such pressure means are conventional and well known in the art. Furthermore, all of the frames and support means are not shown and, again, this is done because they are conventional and well known in the art. It is believed the omission of these parts from the drawings make the figures less complicated and easier to read and understand.

This invention will be further illustrated in detail by the following specific Examples. It should be understood however that although these Examples may describe in particular detail some of the more specific features of the invention they are given primarily for the purposes of illustration and the invention in its broader aspects is not to be construed as limited thereto.

EXAMPLE I

An isotactic polypropylene film having a thickness of about 8 mils and a melt index of 4 is heated to a temperature of at least 280°F. by the heated roll which is at a temperature of 340°F. The film is formed in a pattern in accordance with the present invention using the apparatus depicted in FIGS. 3 and 4, to produce a reticulate sheet material with 10 openings per inch running in the longitudinal direction and 23 openings per inch running in the transverse direction. The film is cooled to 220°F. and removed from the forming roll. The resultant reticulate sheet material is cloudy and contains about 50 percent beta phase crystals. Most of the openings in the sheet material are covered with a very thin film of polypropylene which is clear. The ductility of these windows is between $2.8 \times 10^{-5}$ to $4 \times 10^{-5}$ inches/°K. The film is stretched in the transverse direction at a ratio of 7:1 and in the longitudinal direction at a ratio of 4:1 and the resultant oriented film has a tensile strength in the longitudinal direction of 0.69 pounds per filament and in the cross-direction of 0.93 pounds per filament. The film processess readily without breakage.

EXAMPLE II

An isotactic polypropylene film having a thickness of about 10 mils and a melt index of about 12 is heated to above 280°F. by a heated roll at a temperature of 365°F. The film is embossed in a 10 by 23 pattern as described in Example I. The film is cooled to about 235°F. and removed from the forming roll to form a reticulate sheet material which has a cloudy appearance. The windows in the sheet material have a ductility of about $3.6 \times 10^{-5}$ inches per Kelvin degree. The film contains about 40 percent beta phase crystals. The film is stretched longitudinally at a ratio of 4:1 and transversely at a ratio of 7:1. After stretching the film contains all alpha phase crystals and has a tensile strength in the longitudinal direction of 0.64 pounds per filament and in the cross-direction of 0.94 pounds per filament.

EXAMPLE III

A polypropylene as described in Example I is formed as described in Example I with the exception that it is heated to about 260°F. by the heated roll. The resultant crystals and the windows have a ductility of about $8 \times 10^{-5}$ inches per Kelvin degree. The reticulate sheet material is not openable to a net-like structure.

EXAMPLE IV

A high density polyethylene film about 6 mils in thickness and having a melt index of about 20 is formed as described in Example I. The resultant film is cloudy and is readily orientable. Results comparable to those of Example I are obtained.

EXAMPLE V

A polypropylene film as described in Example I is formed at pressures under 18 pounds per linear inch while at temperatures above 340°F. and also below 340°F. to produce reticulate sheet material in which the thin areas have varying ductilities of from about $8.5 \times 10^{-5}$ inches per degree K to about $14 \times 10^{-5}$ inches per degree K. None of these films are openable into net-like products.

It should be further understood that the above Examples are for purposes of illustration only and are not to be used to delineate the breadth of the scope of the invention. The invention is only limited by the scope of the claims appended hereto.

I claim:

1. Apparatus for forming a reticulate sheet material of a polymer selected from the class consisting of high-density polyethylene and predominantly isotactic polypropylene which comprises; spaced means for supporting and advancing a thin sheet of polymer, said supporting means including means for heating said polymer to a formable state, forming means adjacent said supporting and heating means and in close proximity thereto for removing said polymer while in a formable state from said supporting and heating means while simultaneously applying compressive and shearing forces capable of penetrating through said polymer to form said polymer into a substantially open reticulate structure comprising filaments, said filaments being integral at their intersections and means including said forming means for cooling said substantially open reticulate structure to below the solidification temperature of the polymer and means for removing said reticulate sheet material from said forming means whereby a stretchable reticulate sheet material of said polymer is produced.

2. Apparatus according to claim 1 wherein the means for heating a thin sheet of said polymer is a continuously moving uniform surface heated to a temperature of at least 280°F., said thin sheet being placed on said surface and being heated to 280°F. while moving with said surface.

3. Apparatus according to claim 1 wherein the forming means includes a continuously moving resilient surface having a pattern of continuously arranged recessed areas and discontinuously arranged raised areas disposed uniformly over said surface.

4. Apparatus according to claim 1 wherein the forming means includes pressure applying means for applying from 18 to 125 pounds per linear inch pressure to said polymer while it is being formed.

5. Apparatus according to claim 1 wherein the forming means includes a continuously moving resilient surface having a pattern of recessed areas disposed in the direction of the length and width of said surface to define a pattern of raised areas.

6. Apparatus according to claim 1 wherein the forming means includes a continuously moving resilient surface having an overall heat transfer coefficient of about 10 and having a pattern of continuously arranged recessed areas and discontinuously arranged raised areas disposed uniformly over said surface.

7. Apparatus according to claim 1 wherein the forming means comprises a continuously moving resilient surface having a pattern of continuously arranged recessed areas and discontinuously arranged raised areas disposed uniformly over said surface and pressure applying means for applying from 18 to 125 pounds per linear inch pressure to said polymer while it is being formed.

8. Apparatus according to claim 1 wherein the forming means comprises a continuously moving resilient surface having an overall heat transfer coefficient of about 10 and having a pattern of recessed areas disposed in the direction of the length and width of said surface to define a pattern of raised areas and pressure applying means for applying from 18 to 125 pounds per linear inch pressure to said polymer while it is being formed.

9. Apparatus according to claim 1 wherein the means for heating a thin sheet of said polymer is a continuously moving uniform surface heated to a temperature of at least 280°F., said thin sheet being placed on said surface and being heated to 280°F. while moving with said surface and said forming means comprising a continuously moving resilient surface having an overall heat transfer coefficient of about 10 and having a pattern of continuously arranged recessed areas and discontinuously arranged raised areas disposed uniformly over said surface and pressure applying means for applying from 10 to 125 pounds for linear inch pressure to said polymer while it is being formed.

10. Apparatus for forming a reticulate sheet material of a polymer selected from the class consisting of high-density polyethylene and predominantly isotactic polypropylene which comprises; spaced means for supporting and advancing a thin sheet of polymer, said supporting means including means for heating said polymer to a formable state, forming means adjacent said supporting and heating means and in close proximity thereto for removing said polymer while in the formable state from said supporting and heating means while simultaneously applying compressive and shearing forces capable of penetrating through said polymer to form said polymer into a substantially open reticulate structure comprising intersecting filaments, said filaments being integral at their intersections and means including said forming means for cooling said reticulate structure to below the solidification temperature of the polymer, means for removing said cooled reticulate structure from said cooling and forming means and means for stretching said reticulate structure in the direction along the axis of the filaments whereby an original open, net-like structure of said polymer is produced.

11. Apparatus according to claim 10 wherein the means for heating a thin sheet of said polymer is a continuously moving uniform surface heated to a temperature of at least 280°F., said thin sheet being placed on said surface and being heated to 280°F. while moving with said surface.

12. Apparatus according to claim 10 wherein the forming means includes a continuously moving resilient surface having a pattern of continuously arranged recessed areas and discontinuously arranged raised areas disposed uniformly over said surface.

13. Apparatus according to claim 10 wherein the forming means includes pressure applying means for applying from 18 to 125 pounds per linear inch pressure to said polymer while it is being formed.

14. Apparatus according to claim 10 wherein the forming means includes a continuously moving resilient surface having a pattern of recessed areas disposed in the direction of the length and width of said surface to define a pattern of raised areas whereby intersecting filaments running the length and width of said sheet material are formed and the means for stretching the reticulate structure comprises means for stretching in both the directions of the length and width of said structure to orient the filaments.

15. Apparatus according to claim 10 wherein the forming means includes a continuously moving resilient surface having an overall heat transfer coefficient of about 10 and having a pattern of continuously arranged recessed areas and discontinuously arranged raised areas disposed uniformly over said surface and the means for stretching said reticulate structure comprises means for stretching in both the lengthwise directions of said structure to orient the filaments.

16. Apparatus according to claim 10 wherein the forming means comprises a continuously moving resilient surface having a pattern of continuously arranged recessed areas and discontinuously arranged areas disposed uniformly over said surface and pressure applying means for applying from 20 to 100 pounds per linear inch pressure to said polymer while it is being formed and the means for stretching said reticulate structure comprises means for stretching said structure in both the lengthwise and widthwise directions of said structure to orient the filaments.

17. Apparatus according to claim 10 wherein the forming means comprises a continuously moving resilient surface having an overall heat transfer coefficient of about 10 and having a pattern of recessed areas disposed in the direction of the length and width of said surface to define a pattern of raised areas and pressure applying means for applying from 24 to 100 pounds per linear inch pressure to said polymer while it is being formed whereby intersecting filaments running the length and width of said sheet material are formed and the means for stretching the reticulate structure comprises means for stretching in both the directions of the length and width of said structure to orient the filaments.

18. Apparatus according to claim 10 wherein the means for heating a thin sheet of said polymer is a continuously moving uniform surface heated to a temperature of at least 280°F., said thin sheet being placed on said surface and being heated to 280°F. while moving with said surface and said forming means comprises a continuously moving resilient surface having an overall heat transfer coefficient of about 10 and having a pattern of continuously arranged recessed areas and discontinuously arranged raised areas disposed uniformly over said surface and pressure applying means for applying from 24 to 100 pounds per linear inch pressure to said polymer while it is being formed and the means for stretching said reticulate structure comprises means for stretching said structure in both the lengthwise and widthwise directions of said structure to orient the filaments.

19. Apparatus for forming a reticulate sheet material of a polymer selected from the class consisting of high-density polyethylene and predominantly isotactic polypropylene which comprises a smooth surfaced heated roll, means for rotating said heated roll in a first direction at a first peripheral linear speed, means for continuously feeding a thin sheet of said polymer to the surface of said heated roll at a first position on said surface, a forming roll positioned with its axis parallel to the axis of said heated roll, the surface of said heated roll and said forming roll being in contact with each other to form a nip at a second position disposed from said first position whereby said polymer sheet is heated to a formable state as it passes from said first position to said second position, means for rotating said forming roll in the opposite direction to said heated roll and at a second peripheral linear speed, said forming roll having a pattern of continuous recessed areas and discontinuous raised areas disposed over its surface, means for applying pressure to the nip formed by the heated roll and the forming roll said pressure being capable of penetrating through said polymer to form said thin sheet of polymer into a substantially open reticulate structure of intersecting filaments as it passes said second position and onto said forming roll, said filaments being integral at the intersections, means including said forming roll for cooling said reticulate structure to below the solidification temperature of said polymer while said reticulate structure is on the surface of said forming roll and means spaced from said forming roll for continually removing said cooled reticulate structure from said forming roll to produce a stretchable reticulate sheet material.

20. Apparatus according to claim 18 wherein the heated roll is a metal roll heated to a temperature of at least 280°F.

21. Apparatus according to claim 19 wherein the forming roll has a resilient surface and a Durometer hardness of about 60.

22. Apparatus according to claim 19 wherein the forming roll has a rubber surface.

23. Apparatus according to claim 19 wherein the forming roll has an overall heat transfer coefficient of about 10.

24. Apparatus according to claim 19 wherein the recessed areas in the forming roll are disposed in parallel circular stripes around the roll and in parallel stripes across the roll to produce intersecting filaments running the length and width of the reticulate structure.

25. Apparatus according to claim 19 wherein the peripheral linear speed of the forming roll is from 10 to 20 percent greater than the peripheral linear speed of the heated roll.

26. Apparatus according to claim 19 wherein the means for cooling the reticulate structure includes means for controlling the temperature of the forming roll at a temperature of less than 240°F.

27. Apparatus according to claim 19 wherein the means for applying pressure to the nip comprises a rotatable roll in pressing contact with the surface of said forming roll at a position disposed opposite the nip formed by the heated roll and the forming roll to apply from 18 to 125 pounds per linear inch pressure at the nip of the heated roll and forming roll.

28. Apparatus according to claim 19 wherein the forming roll comprises a rubber roll having a Durometer hardness of about 60 and an overall heat transfer coefficient of about 10.

29. Apparatus according to claim 19 wherein the heated roll is a metal roll maintained at a temperature of at least 280°F., the forming roll has a resilient surface and the recessed areas in the forming roll are disposed in parallel circular stripes around the roll and in parallel stripes across the roll to produce intersecting filaments running the length and width of the reticulate structure, the means for applying pressure to the nip of the heated roll and forming roll comprises a rotatable roll in pressing contact with the surface of the forming roll at a position disposed opposite the heated roll to apply from 18 to 125 pounds per linear inch pressure at the nip of the heated roll and forming roll and the means for cooling the reticulate structure includes means for controlling the temperature of the forming roll at a temperature of less than 240°F.

30. Apparatus according to claim 19 wherein the heated roll is a metal roll maintained at a temperature of at least 280°F., the forming roll is a rubber roll having a Durometer hardness of about 60 and an overall heat transfer coefficient of about 10 and the recessed areas in the forming roll are disposed in parallel circular stripes around the roll and in parallel stripes across the roll to produce intersecting filaments running the length and width of the reticulate structure, the peripheral linear speed of the forming roll is 10 to 20 percent greater than the peripheral linear speed of the heated roll, the means for applying pressure to the nip of the heated roll and the forming roll comprises a rotatable roll in pressing contact with the surface of the forming roll at a position disposed opposite the heated roll to apply from 24 to 100 pounds per linear inch pressure at the nip of the heated roll and forming roll and the means for cooling the reticulate structure includes means for controlling the temperature of the forming roll at a temperature of less than 240°F.

31. Apparatus for forming a reticulate sheet material of a polymer selected from the class consisting of high-density polyethylene and predominantly isotactic polypropylene which comprises a smooth surfaced heated roll, means for rotating said heated roll in a first direction at a first peripheral linear speed, means for continuously feeding a thin sheet of said polymer to the surface of said heated roll at a first position on said surface, a forming roll positioned with its axis parallel to the axis of said heated roll, the surface of said heated roll and said forming roll being in contact with each other to form a nip at a second position disposed from said first position whereby said polymer sheet is heated to a formable state as it passes from said first position to said second position, means for rotating said forming roll in the opposite direction to said heated roll and at a second peripheral linear speed, said forming roll having a pattern of continuous recessed areas and discontinuous raised areas disposed over its surface, means for applying pressure to the nip formed by the heated roll and the forming roll said pressure capable of penetrating through said polymer to form said thin sheet of polymer into a substantially open reticulate structure of intersecting filaments as it passes said second position and onto said forming roll, said filaments being integral at the intersections, means including said forming roll for cooling said reticulate structure to below the solidification temperature of said polymer while said reticulate structure is on the surface of said forming roll, means spaced from said forming roll for continually removing said cooled reticulate structure from said forming roll to produce a stretchable reticulate sheet material, means for heating said stretchable reticulate sheet material, and means for stretching said heated sheet material in the direction along the axis of the filaments to produce an original open net-like material.

32. Apparatus according to claim 31 wherein the heated roll is a metal roll heated to a temperature of at least 280°F.

33. Apparatus according to claim 31 wherein the forming roll has a resilient surface and a Durometer hardness of about 60.

34. Apparatus according to claim 31 wherein the forming roll has a rubber surface.

35. Apparatus according to claim 31 wherein the forming roll has an overall heat transfer coefficient of about 10.

36. Apparatus according to claim 31 wherein the recessed areas in the forming roll are disposed in parallel circular stripes around the roll and in parallel stripes across the roll to produce intersecting filaments running the length and width of the reticulate structure and the means for stretching the reticulate sheet material comprises means for stretching said material in both the direction of its length and width.

37. Apparatus according to claim 31 wherein the peripheral linear speed of the forming roll is from 10 to 20 percent greater than the peripheral linear speed of the heated roll.

38. Apparatus according to claim 31 wherein the means for cooling the reticulate structure includes means for controlling the temperature of the forming roll at a temperature of less than 240°F.

39. Apparatus according to claim 31 wherein the means for applying pressure to the nip comprises a rotatable roll in pressing contact with the surface of said forming roll at a position disposed opposite the nip formed by the heated roll and the forming roll to apply from 18 to 125 pounds per linear inch pressure at the nip of the heated roll and forming roll.

40. Apparatus according to claim 31 wherein the forming roll is a rubber roll having a Durometer hardness of about 60 and an overall heat transfer coefficient of about 10.

41. Apparatus according to claim 31 wherein the heated roll is a metal roll maintained at a temperature of at least 280°F., the forming roll has a resilient surface and the recessed areas in the forming roll are diisposed in parallel circular stripes around the roll and in parallel stripes across the roll to produce intersecting filaments running the length and width of the reticulate structure, the means for applying pressure to the nip of the heated roll and forming roll comprises a rotatable roll in pressing contact with the surface of the forming roll at a position disposed opposite the heated roll to apply from 24 to 100 pounds per linear inch pressre at the nip of the heated roll and forming roll, the means for cooling the reticulate structure includes means for controlling the temperature of the forming roll at less than 240°F., and the means for stretching the reticulate sheet material comprises means for stretching said material in both the direction of its length and width.

42. Apparatus according to claim 3 wherein the heated roll is a metal roll maintained at a temperature of at least 280°F., the forming roll is a rubber roll having a Durometer hardness of about 60 and an overall heat transfer coefficient of about 10 and the recessed areas in the forming roll are disposed in parallel circular stripes around the roll and in parallell stripes across the roll to produce intersecting filaments running the length and width of the reticulate structure, the peripheral linear speed of the forming roll is 10 to 20 percent greater than the peripheral linear speed of the heated roll, the means for applying pressure to the nip of the heated roll and the forming roll comprises a rotatable roll in pressing contact with the surface of the forming roll at a position disposed opposite the heated roll to apply from 24 to 100 pounds per linear inch pressure at the nip of the heated roll and forming roll, the means for cooling the reticulate structure includes means for controlling the temperature of the forming roll at less than 240°F., and the means for stretching the reticulate sheet material comprises means for stretching said material in both the directions of its length and width.

* * * * *

UNITED STATES PATENT OFFICE
CERTIFICATE OF CORRECTION

Patent No. 3,881,381              Dated   May 6, 1975

Inventor(s)  Frank Kalwaites

It is certified that error appears in the above-identified patent and that said Letters Patent are hereby corrected as shown below:

Column 3, line 6, "$10^0$Kelvin" should read -- 10 Kelvin degrees --.

Column 3, line 15, "ten Kelvin per" should read -- ten Kelvin degrees per--

Column 3, line 23, $10^0$Kelvin" should read -- ten Kelvin degrees --.

Column 5, line 64 "be come" should read -- be some --.

Column 9, line 31, "the resultant crystals" should read -- the resultant sheet material is clear and contains about 3% beta phase crystals --.

Column 11, line 57, "lengthwise directions" should read -- lengthwise and widthwise directions --.

Column 11, line 63, "arranged areas" should read -- arranged raised areas --.

Column 13, line 1, "according to Claim 18" should read -- according to Claim 19 --.

Column 15, line 23, "pressre" should read -- pressure --.

Signed and Sealed this

Second Day of November 1976

[SEAL]

Attest:

RUTH C. MASON
*Attesting Officer*

C. MARSHALL DANN
*Commissioner of Patents and Trademarks*